March 11, 1930. W. P. THOMSON 1,749,857
INSULATED RAIL JOINT
Filed May 6, 1929 4 Sheets-Sheet 1

WITNESSES:—
Chas. L. Gruetaner
[signature]

Inventor
William Paton Thomson,
By D. T. Wolhaupter,
Attorney

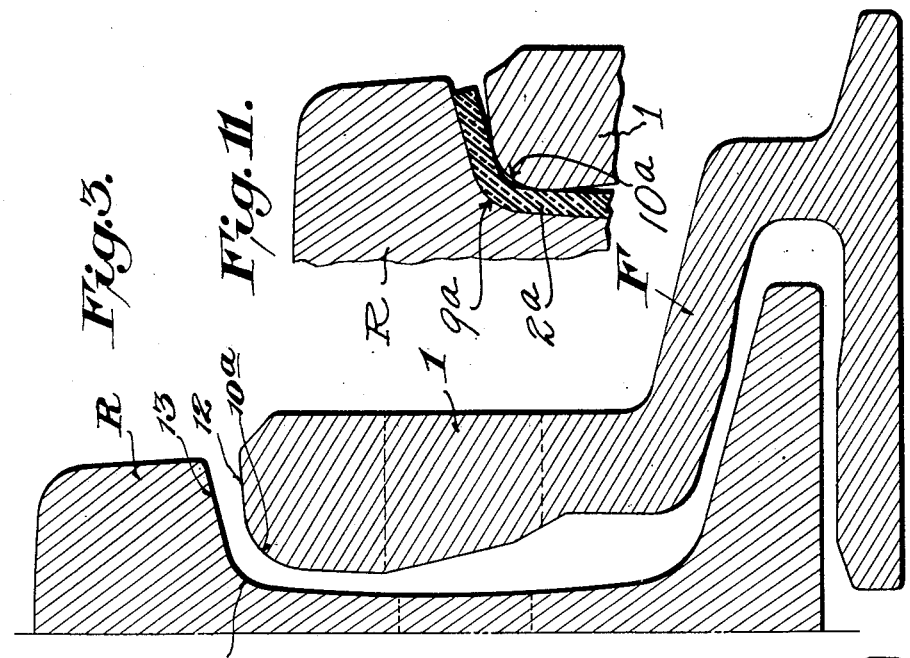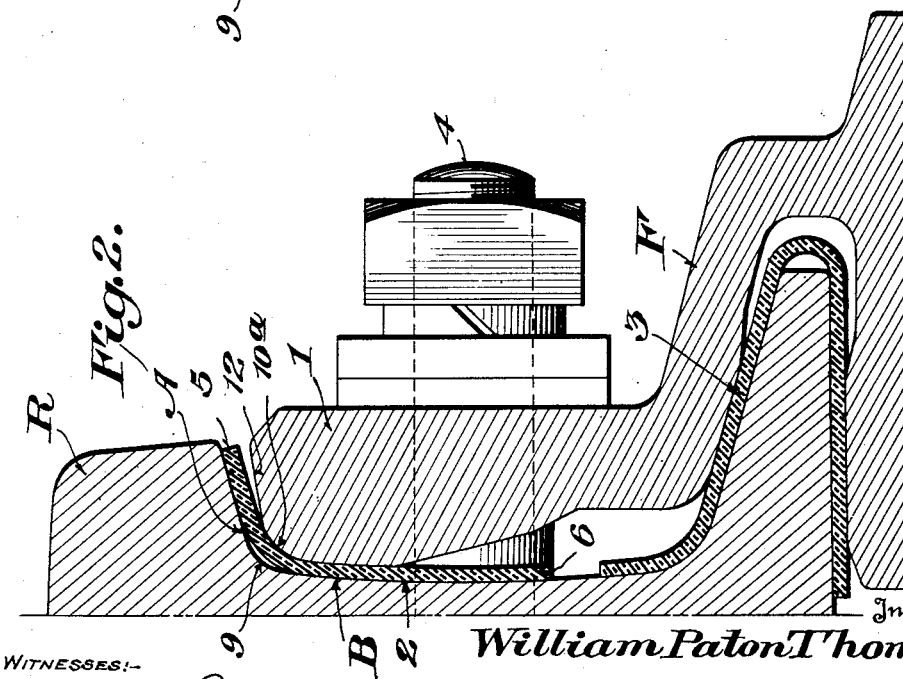

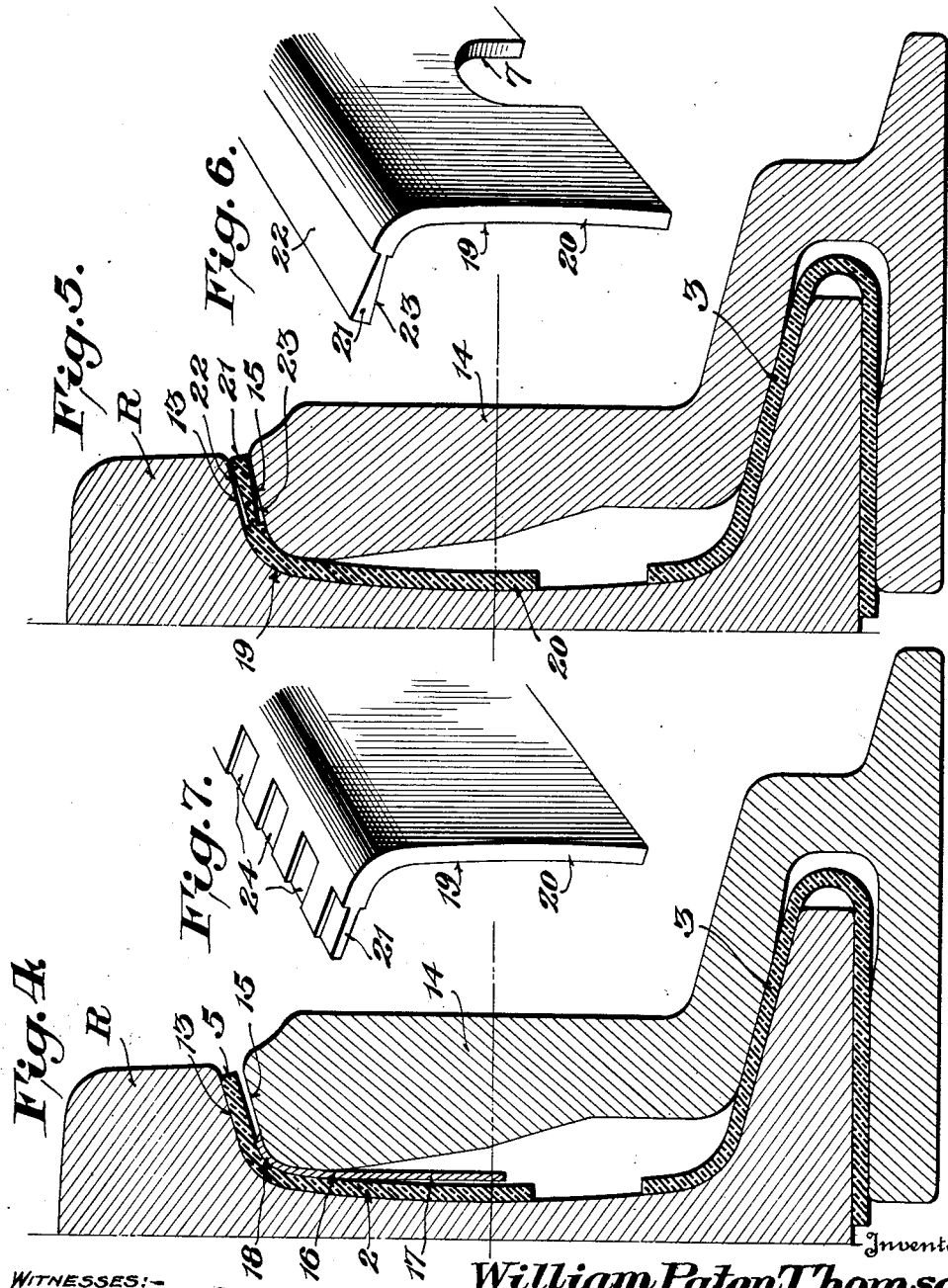

March 11, 1930. W. P. THOMSON 1,749,857
INSULATED RAIL JOINT
Filed May 6, 1929 4 Sheets-Sheet 4
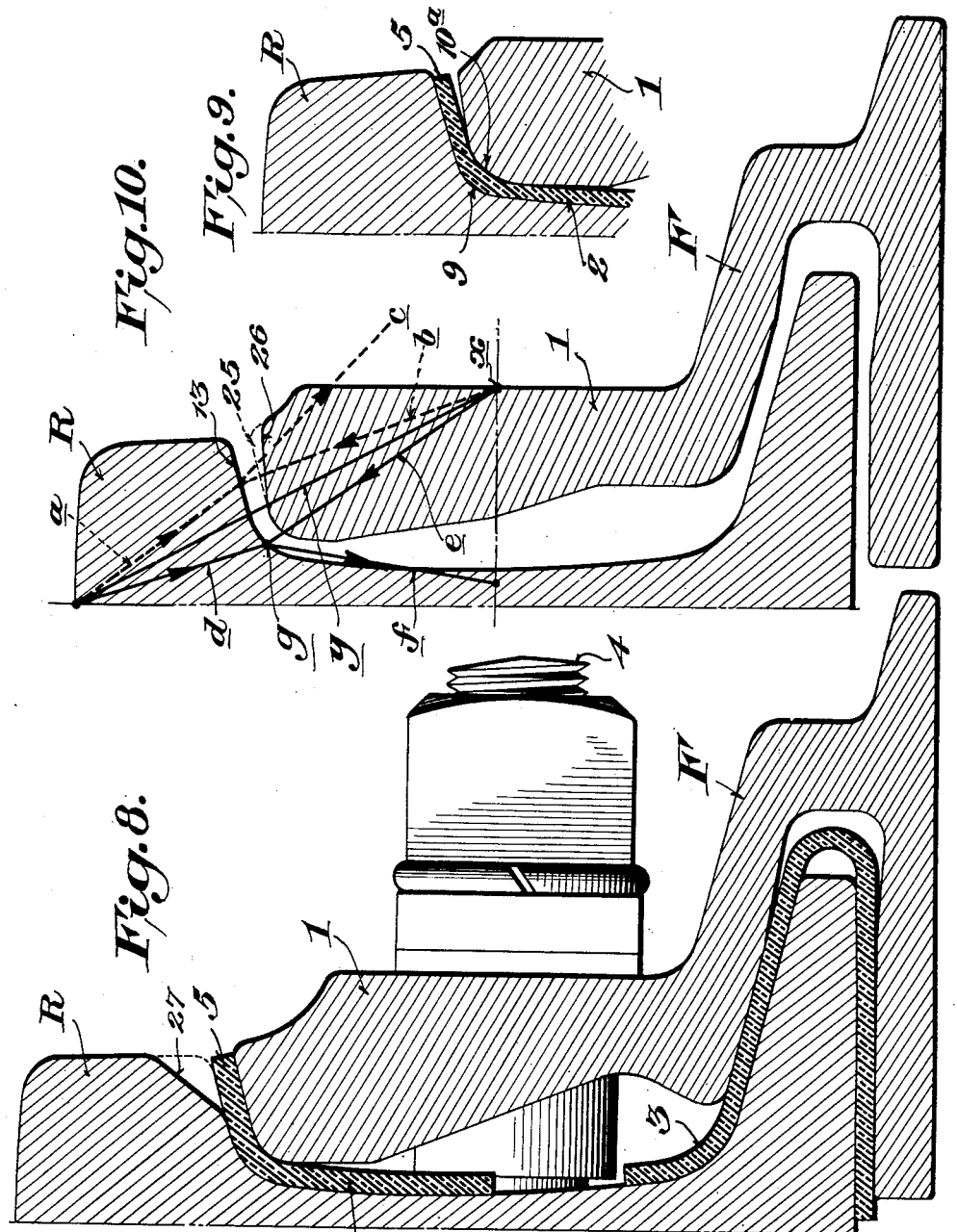

Patented Mar. 11, 1930

1,749,857

UNITED STATES PATENT OFFICE

WILLIAM PATON THOMSON, OF NEW YORK, N. Y., ASSIGNOR TO THE RAIL JOINT COMPANY, OF NEW YORK, N. Y., A CORPORATION OF NEW YORK

INSULATED RAIL JOINT

Application filed May 6, 1929. Serial No. 360,956.

This invention relates to the subject of insulated rail joints utilized in railway tracks in connection with the signal circuits thereof, and has for its principal object the provision of a joint of this character whose mechanical and insulating features respond to the most exacting requirements of service and efficiency.

To that end the invention contemplates a novel construction and coordination of elements in an insulated rail joint structure to secure substantially absolute insulation value for the protection of the signal system while at the same time having and maintaining adequate strength as a rail end connection and support, with the least possible wear on insulation, and with the least possible chance of short-circuiting or other damage that would impair or endanger the signal system. In that connection, the invention centers itself about the novel design of joint bars which are employed in relation not only to all of the insulating members, but also in the special fishing of the head part of each joint bar not only under the rail head, but into the rail head fillet and against the rail web, thereby securing a maximum clamping effect upon the insulation and establishing wide areas of bearing surfaces which insure greater life to the insulation as well as to the joint from a mechanical standpoint.

Heretofore the insulated rail joint has been a cause of apprehension on the part of the railroads because of the highly responsible duty imposed on such joints in track signal circuits, entirely aside from the other important consideration that in many types of insulated rail joints such joints are costly from the standpoint of maintenance and renewal of insulation. These factors are duly taken into consideration in the present invention as well as the more important causes contributing to the weaknesses of former types of insulated rail joints which may be tabulated as follows:—

First: Concentration of load and wear upon too small an area or bulk of the relatively weak insulating material.

Second: Lack of stiffness and strength of the steel joint bar due to faulty or weak design thereof.

Third: Failure to secure perfect fit of component parts due to inadequate provision for necessary manufacturing tolerances.

Fourth: Inability to keep the joint tight, resulting in play between parts and excessive wear.

All of these several conditions are either entirely overcome or greatly improved by the construction and combination of parts involved in the present invention.

A particular feature of practical importance, in carrying forward the present invention, is that of correlating the special fishing of the head part of the joint bar and the insulation, whereby the head insulation of the joint will be so engaged by the head of the bar that the loading forces and wear are prevented from concentrating or acting upon that portion of the insulation underlying the flat underside of the rail head. By these means, it is an object of the present invention to prevent the destructive chafing and sawing action to which the said portion of the insulation is subjected in a head-contact type of rail joint, thereby greatly conserving the life, and therefore the efficiency, of the insulation.

With these and other objects in view, the invention consists in the novel features, and correlation of features, hereinafter more particularly pointed out and explained, and while the invention necessarily is susceptible of structural modification without departing from its spirit or scope, nevertheless a practical embodiment thereof is shown in the accompanying drawings, in which:—

Figure 2 is a sectional half-view of an insulated rail joint illustrating a modified feature of construction wherein means are provided for definitely setting up the headfree principle of splicing rails providing a maximum pinching action on the insulation above and below the head fillet of the rail where the loading action is concentrated.

Figure 3 is a view similar to Fig. 1 with the insulation removed to better illustrate the feature of providing a larger radius for the upper inner corner of the joint bar than that of the head fillet of the rail.

Figure 4 is a sectional half-view illustrating another modified structure wherein provision is made for loading the joint at the head fillet of the rail and through the upper inner corner of the joint bar, leaving that part of the insulation beneath the flat fishing surface of the head of the rail free from compressive strains or chafing action.

Figure 1:
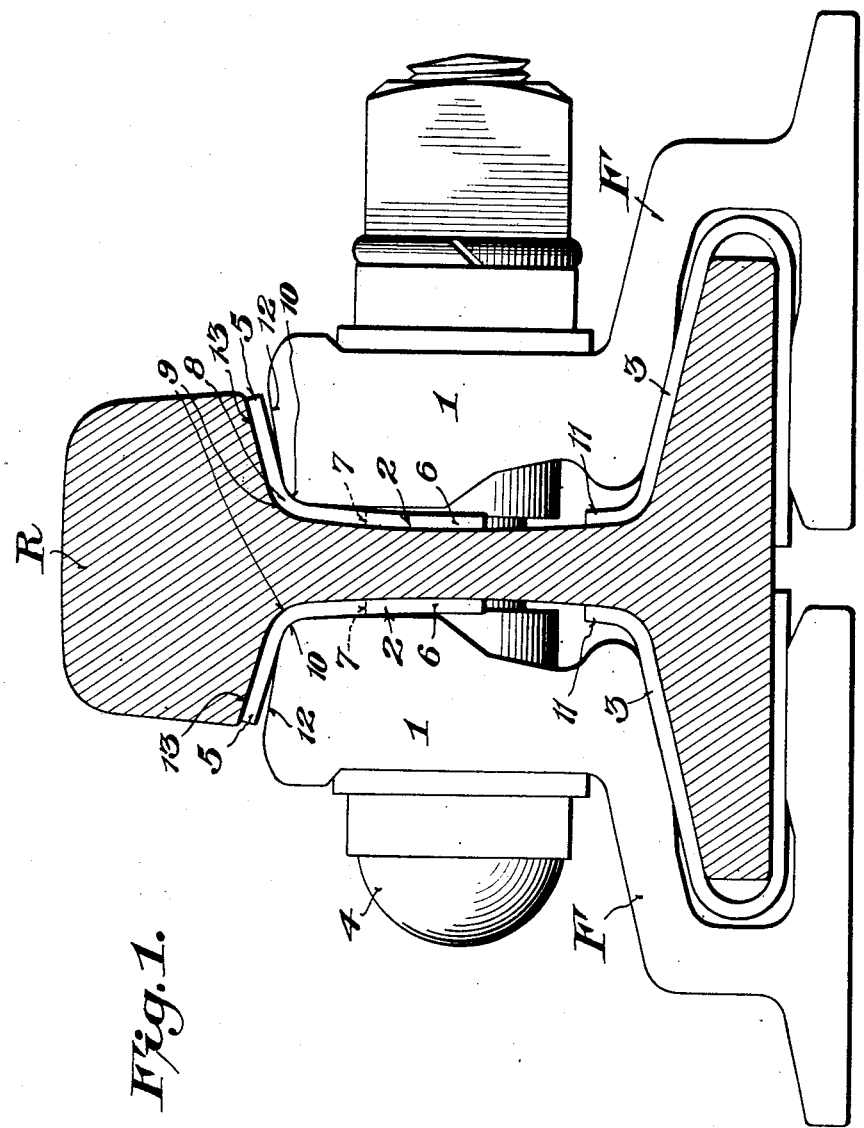
Figure 1 is an end view of an insulated rail joint embodying the primary features of the present invention.

Figure 5 is a view similar to Fig. 4 illustrating a modification wherein the principle of exerting the maximum compressive force on the insulation at the head fillet of the rail and at the inner corner of the splice bar is obtained by so constructing that part of the head insulation beneath the flat fishing surface of the rail head that such portion of the insulation will have a materially diminished resistance to compressive or loading strains.

Figure 6 is a detail in perspective of the modified head insulation having a portion of reduced resistance to loading and compression strains.

Figure 7 is a view similar to Fig. 6 showing a further modification that may be resorted to in special designing of the upper flange of the head insulation to have a reduced or diminished resistance to strains or loads.

Figure 8 is a sectional half-view of a modification of the invention wherein an alteration or modification in the construction of the rail head will obtain many of the desirable results and advantages of the present invention.

Figure 9 is a detail fragmentary view showing a modification involving the use of thickened insulation at the head fillet location.

Figure 10 is a diagrammatic view illustrative of resultant load forces and splicing clamping forces as they resolve themselves in head contact and headfree types of joints, indicating a comparison of these forces in said two types of joints.

Figure 11 is a detail sectional view of a further modification of the invention.

The primary features of the novel insulated rail joint, constituting the present invention, are in combination with the rail R, the opposite joint bars 1, the head and base insulation 2 and 3 respectively, and the bolts 4, with the necessary bolt insulation.

It is not necessary in practicing the invention to make any special change in the form or design of the head or base insulation. These elements in the joint may be of the commonly used and approved fibre pieces to provide the necessary insulation for the head and base portions of the rail. However, it is preferable to employ as a part of the general combination of the present joint, head insulation 2 consisting of a fibre or equivalent insulating head piece of an angle formation having the upper flange 5 underlying the flat underside of the head of the rail, and the depending flange or skirt 6 fitting between the inner side of the bar head and the web of the rail and usually and preferably provided at its lower edge with the keeper notches 7 engaging over the bolts 4 to assist in checking any tendency of the head insulation to creep or become displaced in a longitudinal direction. Also, it will be observed in connection with this head insulation that the angle piece forming the same is made at the juncture of the two flanges 5 and 6 with a curved bearing portion 8 fitting the head fillet 9 of the rail and also presents an outer curved bearing surface into which tightly and evenly fits the inner upper rounded corner 10 of the head of the joint bar. Also, in the present invention a desirable feature may be the use of head insulation 2 thickened at the rail-head fillet location in order to increase the insulation value as well as the life thereof at the point where effective resistance to the loading forces is required, as suggested in detail in Fig. 9.

The base insulation 3 may conveniently be a fibre or equivalent cuff piece bent to sleeve over the rail base flange and having the inner edge of its upper face or flange extended upwardly as at 11 forming a protective insulation lip interposed between the inner lower corner of the joint bar above the rail flange and the lower fillet and web of the rail, thereby insuring insulation for the joint in that particular location.

It will now be seen, by reference particularly to Figs. 1 and 2 of the drawings, and according to the present invention, that a change is made in the conformation of a joint bar conventionally used in a head-contact type of rail joint which endows that joint bar with characteristic headfree splice bar principles of action, thereby tending to conserve the insulating fibre instead of tending to break it down. The change referred to is primary or fundamental to the present invention, namely, that of having the opposing faces of the joint bar and the rail so correlated with the loading forces which are impressed upon the insulation, at and adjacent the head fillet of the rail, that the upper flange or outer portion of the head piece of insulating material affords less resistance to compression than does the inner portion of such insulating material when the insulated rail joint structure is functioning under load conditions. In other words, according to the present invention it is proposed that the insulating material shall have less operative resistance to compression outside of the top of the radius of the head of the splice bar, said radius being opposed to a head fillet of the rail, than has the adjacent insulating material located inside of the top of the said radius. This desirable result may be accomplished in various ways, without departing from the invention, for instance, as shown in Figs. 1 and 2 of the drawings, the outer portion of the upper surface of the joint bar as at 12 is depressed slightly to give it characteristic headfree conformation, leaving a flaring space or interval between said depressed top surface 12 and the flat underside or fishing surface 13 of the rail head, thereby leaving an interval which is substantially filled by the upper flange or portion 5 of the head piece of insulation without such insulation being subjected to any compression or compressive strains whatever. At the same time such arrangement of the insulation functions to safeguard the joint against short-circuiting by preventing metallic particles or other foreign conducting material falling into the interval or space referred to.

Another expedient that may be resorted to in establishing and maintaining the headfree principle of action in an insulated rail joint is suggested in Figs. 2 and 3 of the drawings, wherein the upper inner corner of the joint bar designated 10ᵃ is shown as being formed on a radius somewhat larger than the radius of the head fillet 9 of the rail. This construction, that is, the differential between the radius of the head fillet of the rail and the upper inner corner of the joint bar will insure an inward compression of the head fibre adjacent the top of the radius of the upper inner corner of the head bar, for instance, adjacent the locality designated by the letter A on Fig. 2 of the drawings. A slight yielding of the fibre at this location A will insure a slight inward movement of the foot F of the joint bar from the very beginning of the installation of the joint, thus setting up a headfree principle of action at once and also exerting slight extra pressure on the downward depending portion 6 of the fibre which fits the rail web, the location of this extra pressure depending upon the location of the lower portion of the inner face of the head of the joint bar which parallels the rail web. In other words this location is approximately at the point designated by the letter B on Fig. 2 of the drawings, namely, where the parallelism between the rail web and the lower portion of the inner face of the joint bar ends.

In further explanation of the exemplification of the invention shown in Fig. 2 of the drawings it should be observed that shortly after the installation of the joint the headfree principle of action set up in the joint bar will create a maximum of pinching action in the vicinity of the localities A and B. As such action progresses the insulating fibre between these maximum points of compression will become more and more closely confined against squeezing outward under the rail head or downward along the rail web, and ultimately the double resistance of the confined fibre to compression will be greater than could be obtained on unconfined fibre restricted only to the extent of the head fillet of the rail.

By way of further illustrating the scope of the invention and the range of modification that may be resorted to in carrying the same into effect reference is now made to Fig. 4 of the drawings wherein is shown a construction in which the head contact type of joint bar 14 is employed with its usual upper flat bearing surface 15 paralleling the flat fishing surface 13 of the rail head. In connection with this construction the head and base pieces of insulating fibre are employed, as previously referred to, but a supplementary spacing and bearing member 16 is utilized. This supplementary member 16 may be of metal or other hard material suitable for the purpose, the same being provided with a depending flange or apron portion 17, and has an upper curved bearing flange 18 fitting the upper inner corner of the joint bar and that part of the head insulation 2 fitting the fillet of the rail head and terminating substantially at the top of the radius of the upper inner corner of the joint bar. This provides a widened space between the underside 13 of the rail head and the top surface 15 of the joint bar in which widened space lies the upper flange or outer portion of the head insulation so that it will not be brought under compression from the loading forces. Accordingly, in this form of construction means are provided whereby the insulating material shall have less operative resistance to compression outside of the top of the radius of the head of the splice bar, said radius being opposed to the head fillet of the rail, than has the adjacent insulating material located inside the top of the said radius. Furthermore, the construction described carries forward the idea of the joint being provided definitely with means for causing a greater extent of movement of the joint bar toward the rail web at the foot of the bar than at its head, which action is a characteristic one of the headfree type of rail joint.

Another type of construction that may be employed for decreasing the resistance of fibre underlying the overhanging portions of the rail head to augment the tendency of the head of the bar to tilt upward and outward, is the type of construction suggested in Figure 5 of the drawings. This type of construction represents a conventional head-contact type of joint in which definite headfree clearance is not provided between the underside 13 of the rail head and the upper surface 15 of the joint bar 14, this being the same type of joint bar construction shown in Fig. 4. In this form of construction, that is, the one shown in Fig. 5 of the drawings, the contemplated results are obtained by using a special construction of head insulation designated by the reference numeral 19 in the drawing. This head insulation is of the same general form as previously described, namely, being of the usual fibre material having the depending notched flanged or skirt 20 for interlocking with the bolts and the outwardly extending flange 21 lying between the head of the rail and the upper surface of the joint bar. According to this proposed modification the upper flange 21 or outwardly extending portion of the head insulation has such formation that it will be materially weaker than the remainder of the insulation body so that it will offer substantially less resistance to compression than the insulating material lying inside of the top of the radius of the upper inner corner of the head of the joint bar. In other words, it is proposed, according to this modification of this invention to emasculate or weaken the upper flange 21 of the head insulation and this may be accomplished in various ways, such as by variant thicknesses of the insulation, variant densities, by special contours or any other appropriate provisions whereby the insulating medium between the underside of the head of the rail and the upper surface of the joint bar may be utilized to accomplish the lesser degree of resistance to compression above mentioned. One way of accomplishing this emasculation or weakening is to form the flange 21 with upper and lower undercut portions 22 and 23 extending longitudinally of the insulated material as plainly shown in Fig. 6 of the drawings. Or, by forming such flange 21 with alternate depressions or recesses 24 both above and below the flange with the result of producing subnormally thin portions, and thereby generally reducing or weakening the resistance of this part of the insulation. By whatever means this emasculation or weakening of the upper flange of the head insulation is accomplished the result is to compel the loading forces to pass through and adjacent the head fillet of the rail, and bringing about a construction wherein the fibre will have its maximum points of compression at and adjacent the top and bottom of the radius of the upper inner corner of the joint bar and at and in the head fillet of the rail, thereby utilizing the insulating material in the best possible manner to conserve its life and effectiveness.

The principles and advantages of the present invention may be utilized and maintained in connection with a modified rail structure such as shown in Fig. 8 of the drawings, wherein the lower bottom corner of the rail head is truncated as at 27, thereby compelling the loading forces to pass through the head fillet of the rail and to be deflected inwardly as demonstrated in the graph of Fig. 10.

In explanation of the theory upon which the present invention is based reference is made to the diagrammatic graph of Fig. 10 of the drawings. In this figure of the drawings is shown, by the dotted lines 25 the conventional head-contact type of rail joint opposed to the flat fishing surface of the head of the rail R, and the full lines 26 designate the headfree type of rail joint construction wherein the top surface of the joint bar is depressed so as to provide the headfree clearance now well understood. In the said illustration the joint bar is set off from the rail in the position which it would occupy to accommodate between it and the rail the insulation for the head and foot portions of the bar. Taking the dotted lines $a$, $b$ and $c$ appearing on the graph of Fig. 10 these lines show how the load force directed from the middle of the top of the rail head to the middle of the flat head fishing (13) of the underside of the rail head is met by a like force reacting from the center line of the bolt as at $x$ where it intersects the bolting face of the joint bar. These direct and reacting forces meet a certain distance outside of a straight line $y$ drawn from the center of the top of the rail head to the intersection of the center line of the bolt with the bolting face of the splice bar. The resultant of these meeting forces must pass still farther outside of the direct line $y$, and the third dotted line $c$ with the arrow pointing toward the said letter $c$ indicates the resultant of these acting and reacting forces, which resultant lies at the same angular degree outside the projection of the load force line from the top of the rail to the middle of the head fishing, as the bolt resistance force line $b$ lies inside of said projection. Such being the case the direction of the resultant $c$ makes it obvious that these reacting forces will always tend to force the head of the joint bar outward, and, in accordance with the degree of looseness which may prevail in the structure, there is bound to be a sawing and chafing action on the abutting faces of the rail head and the splice bar, which action is quickly destructive of insulating material lying between these two faces.

Making the same application of the acting and reacting forces as they occur in a headfree type of rail joint, that is, in a headfree splicing structure, the full lines $d$, $e$ and $f$, with the arrows thereon, indicate how the resultant force $f$ in this case reacts inward (instead of outward) into the rail structure in the direction of the said resultant line of force $f$. In this connection it will of course be understood that the middle point of bearing where the acting and reacting forces meet in the headfree type of structure is the middle of the head fillet of the rail as at G, as that is the only load bearing that a headfree splicing structure takes on the rail. Consequently, it will be seen from this comparison of these resultant actions in a head-contact and in a headfree type of rail joint how widely different is their effect upon the structures in which they take place, and explains how the loading of the head insulation at and adjacent the head fillet of the rail instead of outward from the top of the radius of the upper inner corner of the joint bar will maintain and conserve the insulating fibre, whereas in a head contact type of joint the same insulating fibre will break down and deteriorate very quickly, damaging the insulating value of the joint and requiring frequent renewals and repairs.

Referring to Figure 11 it will be seen that the objects of the invention may also be carried out by using a head piece of insulation 2ª of uniform thickness with the head fillet 9ª of the rail and the inner upper rounded corner 10ª of the bar 1 of the same radius. The effect of this arrangement is to provide points of maximum compression in the insulation at points respectively above and below the location of the head fillet of the rail in substantially the same manner as secured in Figure 2.

Other practical forms of construction can be resorted to in carrying out the purposes and principles of the present invention, but from the foregoing it is thought that such purposes and principles are clearly demonstrated by the constructions herein described, so it will be understood that changes in the form, proportion and minor details of construction may be resorted to without departing from or sacrificing any of the advantages of the invention.

I claim:—

1. An insulated rail joint including the rail, the joint bar, and interposed insulating material having throughout its length less operative resistance to compression starting at the top of the radius of the upper inner corner of the joint bar and extending outwardly therefrom than has the adjacent insulating material starting at the top of said radius and extending inwardly therefrom.

2. An insulated rail joint including the rail, the joint bar, and a head piece of insulation having a loading engagement with the head fillet of the rail and the upper inner corner of the bar and provided with a flange member overlying the top surface of the joint bar and offering less resistance to compression than the inner portion of said insulation.

3. An insulated rail joint including the rail, the joint bar, and insulating material interposed between the rail and the bar and having points of greater resistance to compression within the inner and outer limits of the head fillet of the rail and the bar and above and below the medial portion of said fillet than at the medial portion thereof.

4. An insulated rail joint including the rail, the joint bar, and a head piece of insulation interposed between the rail and the bar and having within the inner and outer limits of the head fillet of the bar points of greater compression respectively outward from and above and inwardly of and below the medial portion of the head fillet of the rail than at said medial portion, said insulated material also having an outer portion disposed between the top of the bar and the underside of the rail head which is free from compression strains.

5. An insulated rail joint including the rail, the joint bar, a head piece of insulation interposed between the rail and the joint bar, and means for decreasing the resistance of the insulation which underlies the overhanging portion of the rail head thereby to augment the tendency of the head of the joint bar to tilt upward and outward.

6. An insulated rail joint including the rail, the joint bar, and the head and base pieces of insulation, and means for relieving the insulation underlying the rail head from compression strains and causing a greater extent of movement toward the rail web at the foot of the joint bar than at the head of the joint bar.

7. An insulated rail joint including the rail, the joint bar, and a head piece of insulation interposed between the rail and the bar and having loading engagement solely with the head fillet of the rail and the upper inner corner of the bar.

8. An insulated rail joint including the rail, the joint bar, and a head piece of insulation having loading engagement solely with the head fillet of the rail and the upper inner corner of the joint bar and provided with a flange member overlying the top surface of the joint bar, said flange member being in part at least of less thickness than the depth of the space between the top surface of the bar and the underside of the rail head.

9. An insulated rail joint including the rail, the joint bar, and a head piece of insulation interposed between the top of the joint bar and the underside of the rail head, said insulation being of varying thickness so as to offer different degrees of resistance to compression.

In testimony whereof I hereunto affix my signature.

WILLIAM PATON THOMSON.